(12) United States Patent
Nangia et al.

(10) Patent No.: US 9,363,126 B2
(45) Date of Patent: Jun. 7, 2016

(54) METHOD AND APPARATUS FOR IFDMA RECEIVER ARCHITECTURE

(75) Inventors: Vijay Nangia, Algonquin, IL (US);
Kevin L. Baum, Rolling Meadows, IL (US); Margot Karam, Mount Prospect, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 2048 days.

(21) Appl. No.: 12/336,650

(22) Filed: Dec. 17, 2008

(65) Prior Publication Data
US 2009/0161749 A1    Jun. 25, 2009

Related U.S. Application Data

(60) Provisional application No. 61/015,837, filed on Dec. 21, 2007.

(51) Int. Cl.
| | |
|---|---|
| *H04K 1/10* | (2006.01) |
| *H04L 27/26* | (2006.01) |
| *H04L 5/00* | (2006.01) |
| *H04L 25/03* | (2006.01) |

(52) U.S. Cl.
CPC ........... *H04L 27/2647* (2013.01); *H04L 5/0007* (2013.01); *H04L 25/03159* (2013.01); *H04L 27/2626* (2013.01)

(58) Field of Classification Search
USPC ....................................................... 375/233
See application file for complete search history.

(56) References Cited

U.S. PATENT DOCUMENTS

| | | | | |
|---|---|---|---|---|
| 5,805,567 | A | * | 9/1998 | Ramesh ........................ 370/204 |
| 5,881,097 | A | * | 3/1999 | Lilleberg et al. .............. 375/138 |
| 6,700,490 | B2 | * | 3/2004 | Frederick ................... 340/572.4 |

(Continued)

FOREIGN PATENT DOCUMENTS

| | | |
|---|---|---|
| CN | 1617529 A | 5/2005 |
| CN | 101040437 A | 9/2007 |

OTHER PUBLICATIONS

Sorger, Uli et al: "Interleaved FDMA—A New Spread-Spectrum Multiple-Access Scheme", IEEE International Conference on Communications, ICC 1998, vol. 2, 0-7803-4788-9/98, pp. 1013-1017.

(Continued)

*Primary Examiner* — Lihong Yu
(74) *Attorney, Agent, or Firm* — Faegre Baker Daniels LLP

(57) ABSTRACT

A method and receiver for processing a composite signal (112) in a wireless communication system (100) is provided. The method includes receiving a composite signal (112) within a channel bandwidth, wherein the composite signal comprises one or more symbol streams (108, 110, 116) from a plurality of communication units (103, 104). The method also includes sampling the composite signal at a sampling rate, wherein the sampling rate comprises one of equal to a symbol rate of the composite signal or larger than the symbol rate of the composite signal. In addition, the method includes selecting a symbol sampling phase for each of the symbol streams from a plurality of communication units. The symbol streams from each of the communication units are aligned to produce an aligned composite signal by separating the symbol streams for each of the plurality of communication units and orthogonal recombining the symbol streams for each of the plurality of communication units based on the selected symbol sampling phase for each of the plurality of signals. The symbol streams are also separated based on the aligned composite signal.

19 Claims, 12 Drawing Sheets

(56) References Cited

U.S. PATENT DOCUMENTS

| | | | |
|---|---|---|---|
| 7,139,237 | B2 | 11/2006 | Nangia et al. |
| 7,388,923 | B2 | 6/2008 | Fukuta et al. |
| 7,463,672 | B2 * | 12/2008 | Monsen ............... 375/147 |
| 7,555,071 | B2 * | 6/2009 | Sontowski ............ 375/341 |
| 7,685,622 | B2 * | 3/2010 | Stewart ................ 725/74 |
| 2003/0198305 | A1 | 10/2003 | Taylor et al. |
| 2004/0037262 | A1 * | 2/2004 | Tanada ................. 370/342 |
| 2006/0078075 | A1 | 4/2006 | Stamoulis et al. |
| 2006/0083297 | A1 * | 4/2006 | Yan et al. ............. 375/232 |
| 2006/0094435 | A1 * | 5/2006 | Thomas et al. ....... 455/450 |
| 2006/0203932 | A1 | 9/2006 | Palanki et al. |
| 2007/0070879 | A1 | 3/2007 | Yoshida et al. |

OTHER PUBLICATIONS

Schnell, Michael et al.: "Application of IFDMA to Mobile Radio Transmission", IEEE International Conference on Universal Personal Communications, ICUPC, 1998, vol. 2, 0-7803-5106-1/98, pp. 1267-1272.

Schnell, Michael et al.: "Interleaved FDMA: Equalization and Coded Performance in Mobile Radio Applications", IEEE International Conference on Communications, ICC 19999, vol. 3, 0-7803-5284-X/99, pp. 1939-1944.

State Intellectual Property Office of the People's Republic of China, Notification of the First Office Action for Chinese Patent Application No. 200880122011.x (related to above-captioned patent application), mailed Aug. 3, 2012.

State Intellectual Property Office of the People's Republic of China, Notification of the First Office Action for Chinese Patent Application No. 200880122011.x (related to above-captioned patent application), mailed Apr. 17, 2013.

Korean Intellectual Property Office, International Search Report and Written Opinion for PCT Application No. PCT/US2008/087368 (related to above-captioned patent application), mailed May 29, 2009.

* cited by examiner

METHOD AND APPARATUS FOR IFDMA RECEIVER ARCHITECTURE

FIELD OF THE INVENTION

The present invention relates generally to the field of signal processing, and more specifically, to processing a composite signal in a wireless communication system.

BACKGROUND

In a wireless communication system, transmission of data can take place by using a number of transmission techniques, such as frequency division multiple access (FDMA), time division multiple access (TDMA), code division multiple access (CDMA), global system for mobile (GSM) communication, orthogonal frequency division multiple access (OFDMA), universal mobile telecommunications system (UMTS), interleaved frequency division multiple access (IF-DMA), and so forth. For future broadband systems, in particularly for the uplink, Single-Carrier based approaches with orthogonal Frequency Division Multiple Access (SC-FDMA) are of interest. These approaches, particularly Interleaved Frequency Division Multiple Access (IFDMA) and its frequency-domain related variant known as DFT-Spread-OFDM (DFT-SOFDM), are attractive because of their low peak-to-average power ratio (PAPR), frequency domain orthogonality between users, and low-complexity equalization.

With IFDMA/DFT-SOFDM, multiple communication units can simultaneously transmit signals on orthogonal sets of frequency components. The signals from the different communication units propagate through different wireless channels in a wireless communication system and are received at a node as a composite signal comprising multiple signals from the different communication units. Therefore, a need exists for an efficient method and apparatus for processing the composite signal at the node in a wireless communication system and for detecting and separating the signals that are sent from the different communication units.

In IFDMA modulation, an IFDMA symbol is formed by the block repetition of a symbol block that contains combined subscriber signals, adding a cyclic extension, either before or after the modulation, and pulse shaping of the symbol block. The block repetition increases the bandwidth occupied by a single subscriber signal. Hence, the IFDMA symbol can be considered as a cyclic extension single carrier modulation, with special block repetition to create a "comb" like spectrum, which is interleaved with a number of subscriber signals.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1A:
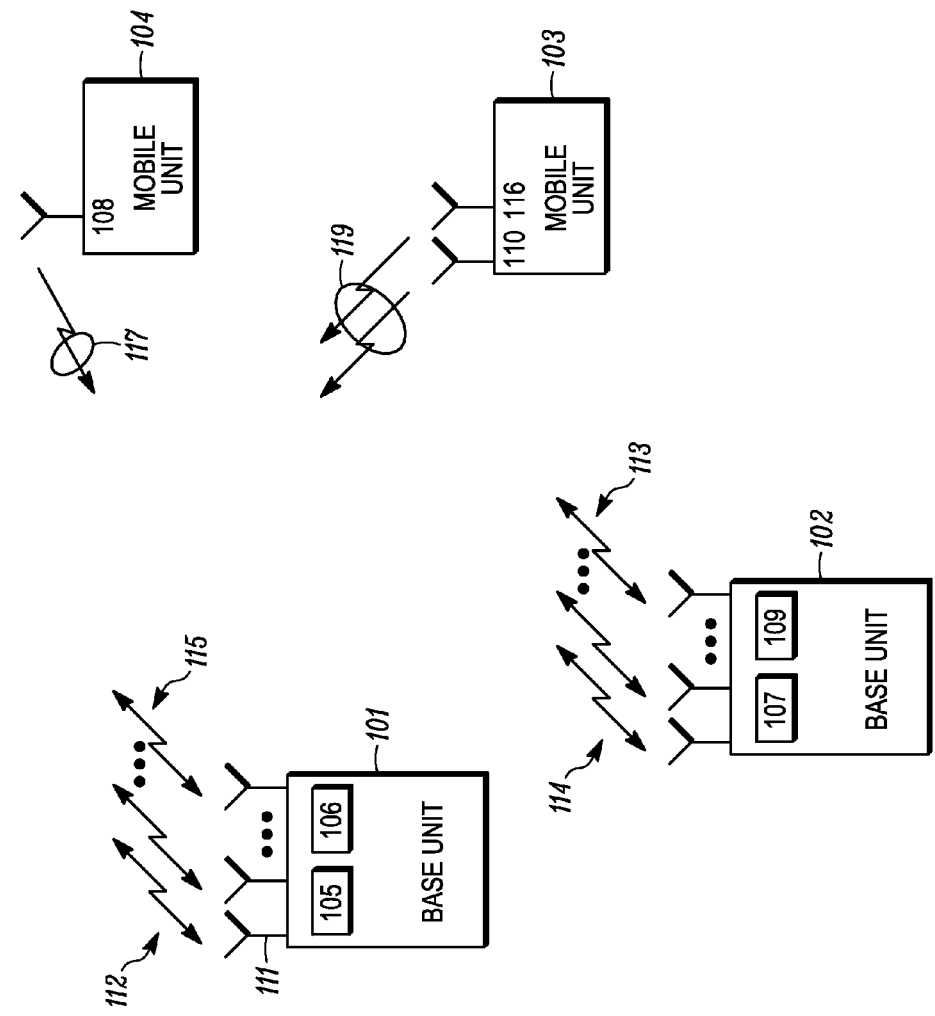
FIG. 1a illustrates wireless communication system utilizing the receiver in accordance with various embodiments of the invention.

According to the principles described below, a receiver architecture for IFDMA signals and a method for using that architecture is disclosed. The method and the receiver for performing that method includes receiving a composite signal within a channel bandwidth, wherein the composite signal comprises one or more symbol streams from a plurality of communication units. The method also can include sampling the composite signal at a sampling rate, wherein the sampling rate comprises one of equal to a symbol rate of the composite signal or larger than the symbol rate of the composite signal and selecting a symbol sampling phase for each of the symbol streams from a plurality of communication units. Moreover, the method can include aligning the one or more symbol streams from each of the plurality of communication units to produce an aligned composite signal by separating the symbol streams for each of the plurality of communication units and orthogonal recombining the symbol streams for each of the plurality of communication units based on the selected symbol sampling phase for each of the plurality of signals and separating the one or more symbol streams for each of the plurality of communication units based on the aligned composite signal. In an embodiment, the step of selecting a symbol sampling phase includes resampling the composite signal based on the selected symbol sampling phase for at least one of the signals. In another embodiment, the step of selecting the symbol sampling phase comprises selecting the symbol sampling phase based on one or more of a channel estimate, a channel signal-to-noise ratio (SNR), a channel signal-to-interference-plus-noise ratio (SINR), and a channel link quality metric estimate for the one or more symbol streams of the communication unit. Moreover, the step of selecting the symbol sampling phase can include selecting a pre-determined sampling phase for at least one of the signals.

In another embodiment, the step of aligning one or more symbol includes separating the one or more symbol streams by demodulating the composite signal for each of the plurality of communication units at the selected symbol sampling phase for the communication unit based on a first communication unit-specific repetition factor and a first communication unit-specific modulation code, modulating each of the demodulated signals for the plurality of communication units based on a second communication unit-specific repetition factor and a second communication unit-specific modulation code. The second communication unit-specific repetition factor and the second communication unit-specific modulation code are selected to maintain orthogonality between the modulated signals for the plurality of communication units and combining the modulated signals to produce the aligned composite signal. The step of aligning the signals from each of the plurality of communication units can also include modulating a channel estimate of the one or more symbol streams based on a communication unit-specific repetition factor and communication unit-specific modulation code and combining the modulated channel estimates.

The step of separating the one or more symbol streams of the signal can include equalizing a portion of the aligned composite signal using a channel estimate of the one or more symbol streams of the signal wherein equalizing includes one of performing a time-domain equalization, performing a decision feedback equalization, performing an iterative equalization, performing an inter-symbol interference (ISI) cancellation, performing a turbo equalization, and performing a maximum likelihood sequence estimation.

With respect to the step of separating the one or more symbol streams, the method can include separating the one or more symbol streams in a time-domain by demodulating the detected symbol stream based on a communication unit-specific repetition factor and a communication unit-specific modulation code. In another embodiment, the step includes separating after detecting the one or more symbol streams in a frequency-domain based on a communication unit-specific repetition factor and a communication unit-specific modulation code. Alternatively, the step of separating the one or more symbol streams further includes separating before detecting the one or more symbol streams in a frequency-domain based on a communication unit-specific repetition factor and a communication unit-specific modulation code.

The method can also include generating channel state information and log-likelihood ratios for the one or more symbol streams from each of the plurality of communication units and decoding the one or more symbol streams of the signal from each of the plurality of communication units.

According to the principles, an alternative receiver architecture for IFDMA signals and a method for using that architecture is disclosed. The method and the receiver for performing the method include receiving a composite signal within a channel bandwidth, wherein the composite signal comprises one or more symbol streams from a plurality of communication units. The method also includes sampling the composite signal at a sampling rate, wherein the sampling rate is equal to or larger than a symbol rate of the composite signal and selecting a composite signal sampling phase for the composite signal. Moreover, the method includes determining a channel estimate of the one or more symbol streams of the signal for at least a subset of the plurality of communication units at the selected sampling phase and separating the one or more symbol streams from each of the communication units in the subset of the plurality of communication units based on one or more of the composite signal, the channel estimates, differing frequency components for the one or more communication units, the selected sampling phase for the composite signal and equalizing the signals of the composite signal using the channel estimates.

In an embodiment, the step of selecting the composite signal sampling phase includes selecting the composite signal sampling phase based on at least one of a channel estimate, a channel signal to noise ratio (SNR), a channel Signal to Interference-plus-Noise Ratio (SINR), and a channel link quality metric estimate. The step of selecting the composite signal sampling phase can also include selecting a pre-determined sampling phase.

In another embodiment, the step of equalizing can include performing one or more of a frequency domain equalization, time-domain equalization, decision feedback equalization, iterative equalization, inter-symbol interference (ISI) cancellation, turbo equalization and maximum likelihood sequence estimation. Moreover, the step of separating the one or more symbol streams can include separating, after detecting the one or more symbol streams in a frequency-domain using a communication unit-specific repetition factor and a modulation code. Alternatively, the step of separating the one or more symbol streams further comprises using a communication unit-specific subcarrier mapping and DFT size. In an embodiment, the method and receiver performing the method includes generating log-likelihood ratios for the one or more symbol streams and decoding the one or more symbol streams.

Before describing in detail the particular method and system for processing a composite signal in a wireless communication system in accordance with the present invention, it should be observed that the present invention resides primarily in combinations of method steps and system components related to the method and the system for processing a composite signal in a wireless communication system. Accordingly, the system components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

In this document, relational terms such as first and second, and the like may be used solely to distinguish one entity or action from another entity or action without necessarily requiring or implying any actual such relationship or order between such entities or actions. The terms 'comprises', 'comprising', 'includes', 'including', or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by 'comprises . . . a' does not, without more constraints, preclude the existence of additional identical elements in the process, method, article, or apparatus that comprises the element.

A 'set' as used in this document, means a non-empty set (i.e., comprising at least one member). The term 'another', as used herein, is defined as at least a second or more. The term 'including' as used herein, is defined as comprising.

FIG. 1a illustrates a wireless communication system 100 in accordance with various embodiments of the invention. Communication system 100 preferably utilizes a next generation single-carrier based FDMA architecture for uplink transmissions 108 and 110, such as interleaved FDMA (IFDMA) or DFT-spread OFDM (DFT-SOFDM). While these can be classified as single-carrier based transmission schemes that have a lower peak-to average power ratio than other embodiments of OFDM systems, they can also be classified as multi-carrier schemes because they are block-oriented, like OFDM, and can be configured to occupy only a certain set of "sub-carriers" or frequency components in the frequency domain similar to OFDM. Thus, IFDMA and DFT-SOFDM can be classified as both single-carrier and multi-carrier since they have single carrier characteristics in the time domain and multi-carrier characteristics in the frequency domain. On top of the baseline transmission scheme, the architecture may also include the use of spreading techniques such as direct-sequence CDMA (DS-CDMA), multi-carrier CDMA (MC-CDMA), multi-carrier direct sequence CDMA (MC-DS-CDMA), Orthogonal Frequency and Code Division Multiplexing (OFCDM) with one or two dimensional spreading, or simpler time and/or frequency division multiplexing/multiple access techniques, or a combination of these various techniques.

Even though IFDMA and DFT-SOFDM can be seen as single-carrier-based schemes, during operation of an IFDMA system or a DFT-SOFDM system, multiple sub-carriers or frequency components (e.g., 512 sub-carriers) are utilized to transmit wideband data. The wideband channel is divided into many narrow frequency bands or frequency components (sub-carriers), with data being transmitted in parallel on sub-carriers. However, a difference between OFDM and IFDMA/DFT-SOFDM is that each data symbol in OFDM is mapped to a particular sub-carrier. In IFDMA/DFT-SOFDM a portion of each data symbol is present on every occupied sub-carrier. Therefore, each occupied sub-carrier contains a mixture of multiple data symbols in IFDMA/DFT-SOFDM.

Communication system 100 includes base unit 101 and 102, and remote mobile communication units 103, and 104. A base unit comprises a transmitters 105 and 107, and receiver 106 and 109, that serve a number of remote units within a sector. A remote mobile communication unit may also be referred to as a subscriber unit, a mobile unit, user equipment, a user, a terminal, a subscriber station, or similar terminologies from the art and can be a cellular phone, laptop computer, personal digital assistance and other similar devices.

The physical area served by the communication network may be divided into cells, and each cell may comprise one or more sectors in connection with base units 101, 102. The cells are served by at least one base unit 101, 102. When multiple antennas 111 are used to serve each sector to provide various advanced communication modes (e.g., adaptive beam forming, transmit diversity, transmit SDMA, and multiple stream transmission, etc.), multiple base units can be deployed. These base units within a sector may be highly integrated and may share various hardware and software components. For example, all base units co-located together to serve a cell can constitute what is traditionally known as a base station. Multiple antennas may also be used at remote units to provide various advanced communication modes (e.g., transmit diversity, multiple stream transmission, etc.).

Base units 101 and 102 transmit downlink communication signals 113 and 115 to serving remote units on at least a portion of the same resources (time, frequency, or both). Remote unit 103 and 104 communicates with one or more base units 101 and 102 via uplink communication signals 117 and 119, respectively using IFDMA/DFT-SOFDM on at least a portion of the resources. The uplink communication signals 117 and 119 comprises at least one symbol stream from the remote units 103 and 104 using at least one antenna.

For example, communication signal 117 transmitted by remote unit 103 comprises a single symbol stream 108 using one antenna while communication signal 119 transmitted by remote unit 104 comprises two symbol streams 110 and 116 using two antennas. As mentioned above, the uplink communication signals 117 and 119 from remote units 103 and 104 occupy different set of sub-carriers of frequency components within the channel bandwidth. Preferred occupancy of sub-carriers for communications from remote units include "localized" occupancy, wherein at least two of the occupied sub-carriers are adjacent, and "distributed" occupancy, wherein at least two of the occupied sub-carriers are not adjacent.

The uplink communication signals 117 and 119 from remote units 103 and 104 are received at receivers 106 and 109 of one or more base units 101 and 102 as a composite signal 112 and 114 comprising a combination of the communication signals 117 and 119. The uplink communication signals 117 and 119 may be distorted by the characteristics of propagation channel between the remote unit 103 and 104 and the base unit 101 and 102. The receiver 106 and 109 process the composite signal 112 and 114, respectively, to detect and separate the symbols streams of the uplink communication signals 117 and 119. Separation of the symbol streams is necessary for extracting the information or data in the symbol streams from the different remote units 103 and 104.

It should be noted that while only two base units and two remote units are illustrated in FIG. 1, one of ordinary skill in the art will recognize that typical communication systems comprise many base units in simultaneous communication with many remote units. It should also be noted that while the present invention is described primarily for the case of uplink transmission from a remote unit to a base station, the invention is also applicable to downlink transmissions from base stations to remote units. A base unit or a remote unit may be referred to more generally as a communication unit.

Figure 1B:
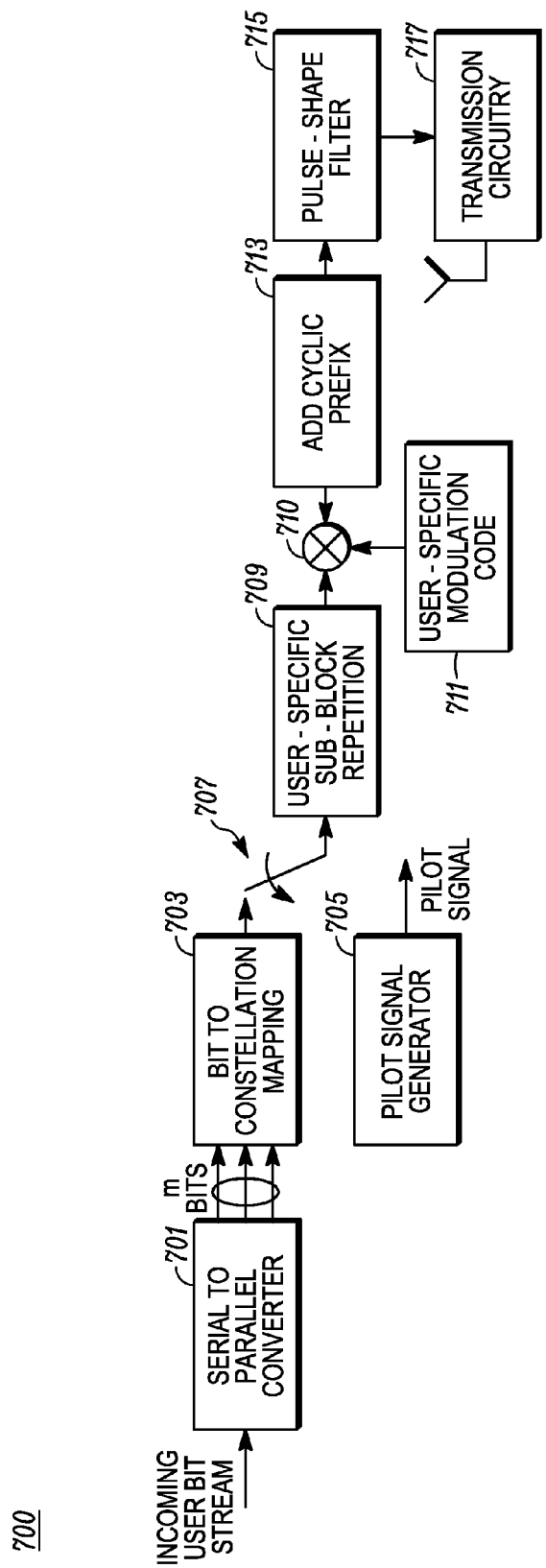
FIG. 1b illustrates a block diagram of a transmitter in the wireless communication system.

FIG. 1b is a block diagram of IFDMA transmitter 700 performing time-domain signal generation. During operation incoming data bits are received by serial to parallel converter 701 and output as m bit streams to constellation mapping circuitry 703. Switch 707 serves to receive either a pilot signal (sub-block) from pilot signal generator 705, or a data signal (sub-block) from mapping circuitry 703 of sub-block length, Bs. A pilot signal is commonly used for communication systems to enable a receiver to perform a number of functions, including but not limited to, the acquisition and tracking of timing and frequency synchronization, the estimation and tracking of channels for subsequent detection and decoding of the information data, the estimation and monitoring of the characteristics of other channels for handoff, interference suppression, etc. The length of the pilot sub-block may be different (preferably smaller) than that of the data sub-block. Regardless of whether pilot sub-block or data sub-block are received by user-specific sub-block repetition circuitry 709, circuitry 709 serves to perform sub-block repetition with repetition factor Rd on the sub-block passed from switch 707 to form a data block of block length B. Block length B is the product of the sub-block length Bs and repetition factor Rd and can be different for pilot and data blocks.

The outputted data block and a communication-specific modulation code 711 are fed to modulator 710. Thus, modulator 710 receives a symbol stream (i.e., elements of data block) and a communication specific IFDMA modulation code (sometimes referred to as simply a modulation code). The output of modulator 710 comprises a signal existing at certain evenly-spaced frequencies, or sub-carriers, the sub-carriers having a specific bandwidth. With the evenly-spaced sub-carriers, i.e. spacing >1, the signal is said to have a distributed sub-carrier occupation within the channel bandwidth. When the repetition factor Rd is 1, the signal occupies all the sub-carriers within its transmission bandwidth, which is less than or equal to the channel bandwidth. In this case, the signal is said to have a localized sub-carriers or frequency components. The actual sub-carriers that signal utilizes is dependent upon the repetition factor Rd of the sub-blocks and the particular modulation code utilized. By varying the block length B, the specific bandwidth of each subcarrier also varies such that with larger block lengths having smaller sub-carrier bandwidths. A cyclic prefix is added by circuitry 713 and pulse-shaping takes place via pulse-shaping circuitry 715. The resulting signal is transmitted via transmission circuitry 717.

Figure 1C:
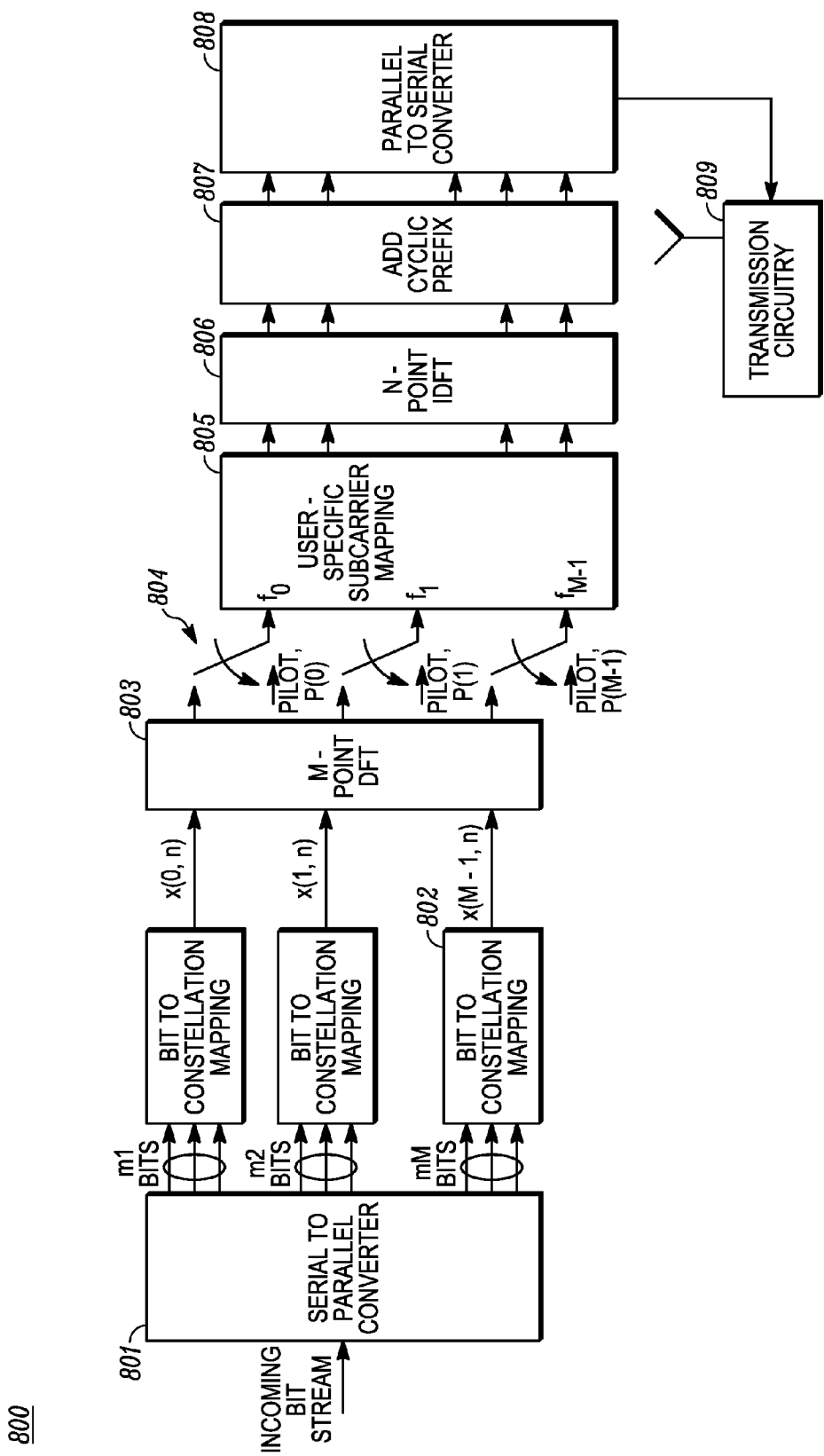
FIG. 1c illustrates a block diagram of another transmitter in the wireless communication system.

FIG. 1c is a block diagram of transmitter 800 used to transmit pilot symbols and data symbols in the frequency domain using a DFT-SOFDM transmitter. Converter 801, bit constellation map 802, and inverse discrete Fourier Transformer (IDFT) 806, cyclic prefix circuitry 807, converter 808 and transmission circuitry 809 are very similar to a conventional OFDM/OFDMA transmitter, while blocks 803 and 805 are unique to DFT-SOFDM. As with conventional OFDM, the IDFT size (or number of points, N) is typically larger than the maximum number of allowed non-zero inputs. More specifically, some inputs corresponding to frequencies beyond the edges of the channel bandwidth are set to zero. This can provide an oversampling function to simplify the implementation of the subsequent transmission circuitry. Different subcarrier bandwidths are used for pilot blocks than for the bandwidth used for the data blocks, corresponding to different pilot block and data block lengths.

In the transmitter of FIG. 1b, different subcarrier bandwidths can be provided by different IDFT sizes (N) for pilot blocks and data blocks. For example, a data block may have N=512, and the number of usable subcarriers within the channel bandwidth may be B=384. Then, an example of a pilot block having a larger subcarrier bandwidth (and more specifically, a subcarrier bandwidth twice as large as a data block) is obtained by using N=512/2=256 for the pilot block, with the number of usable pilot subcarriers then being B=384/2=192. The specific set of subcarriers out of the usable ones that are occupied by a data block or a pilot block are determined by the mapping block 805. To provide a low peak-to-average power ratio (PAPR), the occupied subcarriers for a particular transmission should have a constant separation; for example, an eight subcarrier separation. The occupied subcarrier separation can be as small as 1 subcarrier. The number of occupied subcarriers for a particular data block determines the size (or number of points M) of DFT 803 for that data block. Likewise the number of occupied subcarriers for a particular pilot block determines the size (or number of points M) of DFT 803 for that pilot block. The inputs to DFT 803 for a data block are the M data symbols to be transmitted in that data block. The data symbols may be obtained by conventional conversion of a bit stream into a constellation-based symbol stream (e.g., QPSK, QAM, etc.), as in blocks 801-802. The pilot symbols to be transmitted in a particular pilot block can be provided to mapping block 805 either directly, as indicated by the switch 804, or by moving the pilots and switch 804 to the input of DFT 803 (not shown). As described, both the DFT size M and the IDFT size N may be smaller for a pilot block than a data block when the pilot subcarrier bandwidth is larger than the data subcarrier bandwidth. The mapping block 805 selects the subcarriers needed into the available subcarriers and provides the available subcarriers to the N-point IDFT OFDM modulator 806

The output of N-point IDFT OFDM modulator 806 comprises a signal existing at certain evenly-spaced frequencies or distributed frequency components, or sub-carriers that has an allowable spacing as small as 1 sub-carrier. The output of modulator 806 results in a signal existing on adjacent sub-carriers or localized frequency components. The actual sub-carriers that the signal utilizes is dependent upon M and the particular sub-carrier mapping utilized. Thus, by changing the sub-carrier mapping, the set of occupied sub-carriers changes. A cyclic prefix is added by circuitry 807 followed by a parallel to serial converter 808. Also, although not shown, additional spectral shaping can be performed on the DFT-SOFDM signal to reduce its spectral occupancy or reduce its peak-to average ratio. This additional spectral shaping is conveniently implemented by additional processing before IDFT 806 and may, for example, be based on weighting or overlap-add processing.

Figure 2:
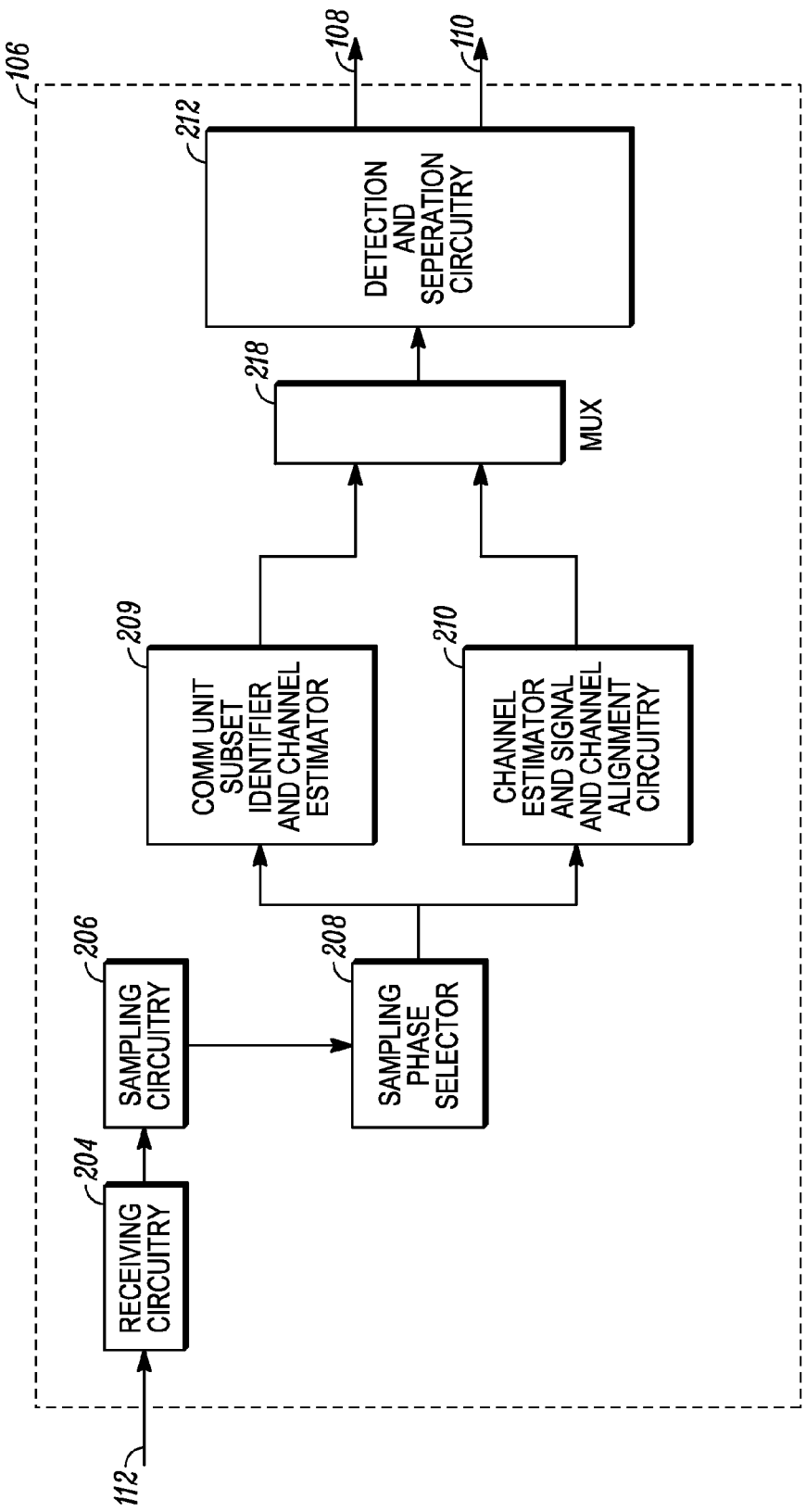
FIG. 2 illustrates a block diagram of a receiver in a wireless communication system, in accordance with an embodiment of the invention.

FIG. 2 illustrates a block diagram of the receiver 106 and 109 in the wireless communication system 100, in accordance with various embodiments of the invention. The composite signal 112 comprises the first communication signal 117 and the second communication signal 119 from different communication units 103 and 104, respectively. Signal 117 comprises one symbol stream 108 while signal 119 comprises two symbol streams 116 and 119. The composite signal 112 may also include more than two communication signals in practice. The receiver 106 takes the composite signal 112 as an input and then performs demodulation, detection and separation of the composite signal into the first symbol stream 108, the second symbol stream 110 and third symbol stream 116 followed by channel decoding. The order of operation of demodulation, detection and separation can be interchanged and will be elaborated in various embodiments of the invention described below. The receiver 106 includes a receiving circuitry 204, a sampling circuitry 206, a symbol sampling phase selector 208, an alignment circuitry 210, a channel estimation circuitry 214, a communication unit subset selector circuitry 216, and a detection and separation circuitry 212.

The receiving circuitry 204 receives the composite signal 112 in a wireless communication system 100. In an embodiment of the present invention, the receiving circuitry can also filter the received composite signal 112. The signals corresponding to the different users have at least one of differing localized, and differing distributed frequency components within the channel bandwidth. The sampling circuitry 206 samples the composite signal 112 at a predefined sampling frequency. The sampling circuitry can also filter the received composite signal. The predefined sampling frequency of the sampling circuitry 206 is equal to or greater than a symbol rate of the composite signal 112 and the symbol streams 108, 110, and 116 that make up the composite signal. The sampling circuitry 206 of the receiver 106 can re-sample either by up-sampling or down-sampling the composite signal to obtain the predefined sampling frequency. In an embodiment of the present invention, the sampling circuitry 206 samples the composite signal 112 at a sampling frequency that is a multiple of the symbol rate of the composite signal 112. The choice of the sampling rate of the sampling circuitry 206 is typically a trade-off between complexity and accuracy of the receiver 106. A high sampling rate enables more accurate symbol-sampling phase selection of the composite signal 112 while increasing the complexity of the receiver while having a lower sampling rate simplifies the operation and reduces the accuracy.

The output of the sampling circuitry 206 of the receiver 106 acts as an input to the symbol-sampling phase selector 208. The symbol sampling phase selector 208 selects a symbol-sampling phase for each of the signals 117 and 119 comprising the composite signal. Further, the symbol sampling phase selector 208 identifies a channel for the sampled first symbol stream 108 and the sampled second symbol stream 110 to be output by the receiver. The symbol phase selector 208 selects the symbol-sampling phases for the signal 117 and the signal 119 based on one or more parameters. Examples of these parameters include, but are not limited to, a channel estimate, a channel signal to noise ratio (SNR), a channel Signal to Interference-plus-Noise Ratio (SINR), and a channel link quality metric estimate for the at least one symbol stream 108, 110, 116 of the communication units 103 and 104. Further, the symbol sampling phase selector 208 resamples or decimates the composite signal to its selected symbol sampling phase for the signals 117 and 119 independently by using the corresponding selected symbol-sampling phase selected by the symbol-sampling phase selector 208 for each of the symbol streams. The re-sampled or decimated composite signal associated with each of the signals 117 and 119 are fed to the alignment circuitry 210 and channel estimator 209. The subset selector circuitry selects the appropriate subsets for each of the first signal 117 and the second signal 118. The outputs of the channel alignment circuitry 210, channel estimator 214 and subset identifier 213 are multiplexed together by the multiplexer 218 and then input to the detection and separation circuitry 212.

The output of the sampling phase selector 208 is also provided to a communication unit subset identifier 3215 as well as a channel estimator 214. The identifier 216 identifies each of the communication nits that contribute symbol streams to the composite signal. The estimator 214 estimates the various symbol streams in the composite signal The signal alignment circuitry 210 aligns the first signal 117 and the second signal 119. The outputs of the alignment circuitry 210, identifier 214 and channel estimator 209 act as an input to the detection and separation circuitry 212 by way of the multiplexer 218. The detection and separation circuitry 212 of the receiver 106 detects the different symbol streams from the aligned composite signal 112 output from the alignment circuitry 210. The detection and separation circuitry 212 further separates the composite signal 112 into the first symbol stream 108 associated with the signal transmitted from the first communication unit 103 and the second symbol stream 110 and third symbol stream 116 associated with the signal transmitted from the second communication unit 104. Hence, the transmitted symbol stream 108, 110, 116 are obtained as the output of the detection and separation circuitry 212.

Figure 3:
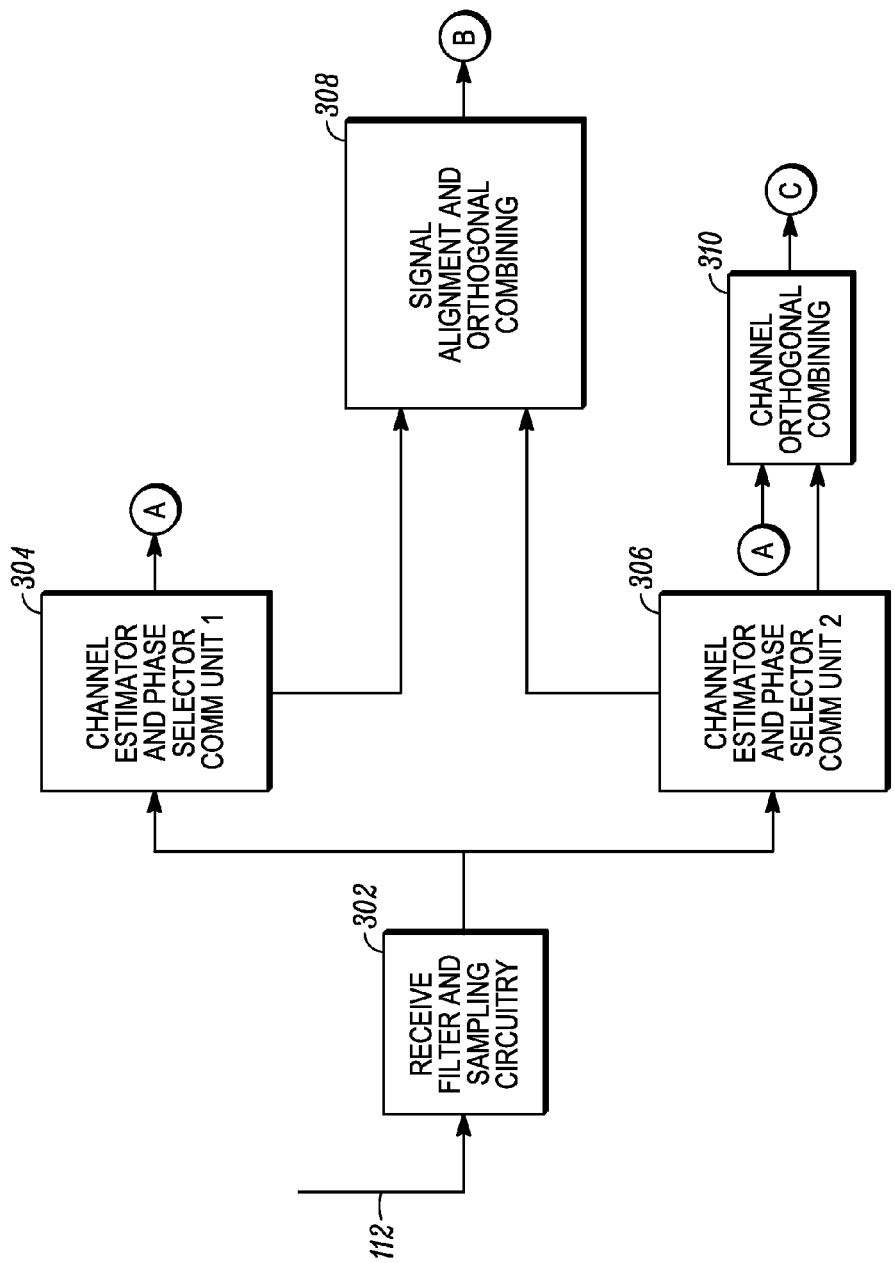
FIGS. 3 and 4 illustrate a block diagram of the receiver in the wireless communication system, in accordance with another embodiment of the invention.
Figure 4:
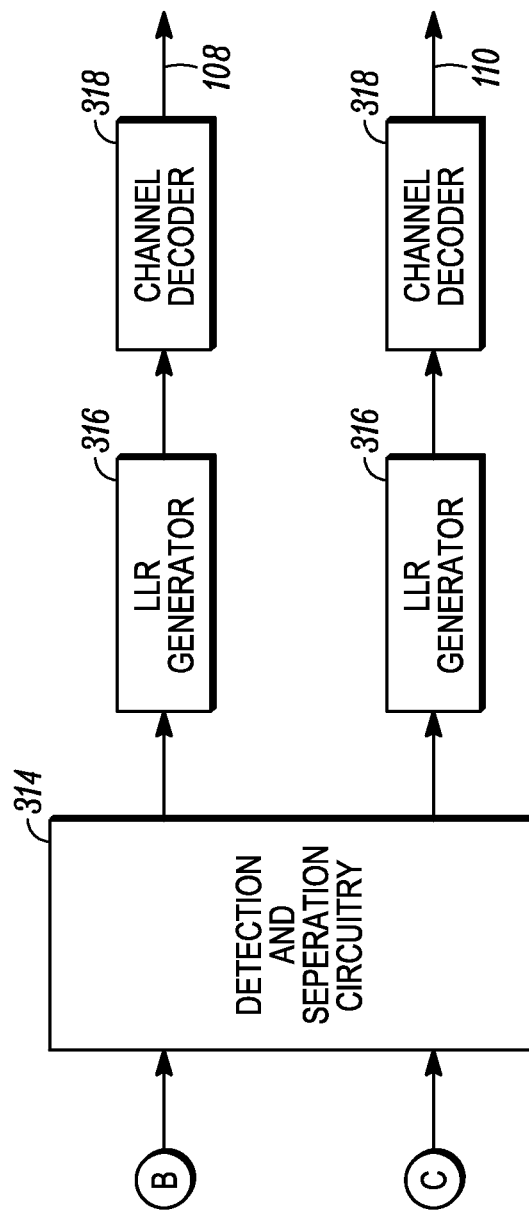

FIGS. 3 and 4 illustrate a block diagram of the receiver 106 in the wireless communication system 100, in accordance with another embodiment of the invention. The composite signal 112 is provided to the receiver 106 as an input, and the output of the receiver 106 is the first symbol stream 108, the second symbol stream 110, and the third symbol stream 116. It should be appreciated that although the composite signal 112 is shown to include the first communication signal 117 and the second communication signal 119, it may include more than two signals or symbol streams in practice. The receiver 106, as described in the foregoing specification, is capable of separating symbol streams associated with two or more communication signals. The receiver 106 includes a filtering and sampling circuitry 302, a first channel estimator and phase selector 304, a second channel estimator and phase selector 306, a signal alignment and orthogonal combining circuitry 308, a channel orthogonal combining circuitry 310, a detection and separation circuitry 314, a bit reliability generator 316, and a channel decoder 318. The first symbol stream 108 and the second symbol stream 110 are signals that make up the received composite signal and are from different subscribers and have interleaved frequency components. The filtering and sampling circuitry 302 receives the composite signal 112, and then the composite signal 112 is filtered and sampled by examining the different subcarriers of the composite signal. The receive filter 322 filters inter-symbol interference between the first symbol stream 108 and the second symbol stream 110 present in the composite signal 112. As stated, the choice of the sampling rate of the filtering and sampling circuitry 302 is generally a trade-off between complexity and accuracy for the receiver 106. Typically, the sampling rate of the filtering and sampling circuitry 302 is larger than a symbol rate of the composite signal 112.

The composite signal 112 from the filtering and sampling circuitry 302 is input to the first channel estimator and phase selector 304 and the second channel estimator and phase selector 306. The first channel estimator and phase selector 304 estimates a channel and selects a phase for the first symbol stream 108 (of first user) of the composite signal 112. The second channel estimator and phase selector 306 estimates a channel and selects a phase for the second symbol stream 110 (of second user) of the composite signal 112. The phase selectors select the sampling phase for the particular user or remote communication unit based on the channel estimation. As the signals can be IFDMA signals, the estimator uses IFDMA techniques to estimate the channels of the composite signal for the symbol streams for each of the plurality of communication units. It should be appreciated that the number of channel estimators in this embodiment of the present invention depends on the number of symbol streams that make the composite signal 112. However, in various other embodiments only a single channel estimator may be used for estimating channels for different users.

In an embodiment of the present invention, cyclic extensions added by the communication unit 104 at the transmitting stage may also be removed. The composite signal 112, after being decimated on a per user basis using the estimator and phase selectors 304, 306 and using the corresponding selected symbol sampling phase, is provided to the signal alignment and orthogonal combining circuitry 308, which is shown in more detail in FIG. 5, and the channel orthogonal combining circuitry 310. The sampling phase for composed signal for user 1 and communication unit 104 is sent to the signal alignment and orthogonal circuitry 308. The sampling phase for composed signal for user 2 and communication unit 103 sampling phase is sent to the signal alignment and orthogonal circuitry 308. The composite signals received by signal alignment circuitry 308 are composite signals from multiple users or communication units but where each of the signals is at a particular sampling phase. The signal alignment and orthogonal combining circuitry 308 aligns the first symbol stream 108 and the second symbol stream 110. Further, the signal alignment and orthogonal combining circuitry 308 orthogonally combines the first decimated composite signal and the second decimated composite signal. The signal alignment and orthogonal combining circuitry 308 modulates the first demodulated signal, using the first communication unit-specific repetition factor and the first modulation code. Similarly, the signal alignment and orthogonal combining circuitry 308 modulates the second demodulated signal, using the second communication unit-specific repetition factor and the second modulation code. The signal alignment and orthogonal combining circuitry 308 modulates respectively the first demodulated signal and the second demodulated signal by using the IFDMA technique and using respectively a third and fourth modulation code and repetition factors to produce a remodulates signal for each particular communication unit, and this is accomplished at the best phase for each communication unit. Further, the signal alignment and orthogonal combining circuitry 308 combines the modulated first symbol stream 108 and the modulated second symbol stream 110.

The channel estimation outputs of the first channel estimator and phase selector 304 and the second channel estimator and phase detector 306 are also provided to the channel orthogonal combining circuitry 310 of the receiver 106. The channel orthogonal combining circuitry 310 modulates and orthogonally combines the channel estimates of the first symbol stream 108 and the second symbol stream 110 by using the third modulation code and the fourth modulation code, respectively. The output from the channel orthogonal combining circuitry 310 and the signal alignment and orthogonal combining circuitry 308 are provided as inputs to the detection and separation circuitry 314. In other words, the input to the detection and separation circuitry 314 includes the orthogonally combined channel estimate of the first symbol stream 108 and the second symbol stream 110, and the aligned and orthogonally combined first symbol stream 108 and the second symbol stream 110. The detection and separation circuitry includes a user separation IFDMA demodulation circuitry.

The frequency domain equalizer transforms the aligned and combined signal, and the combined channel estimates of the first symbol stream 108 and the second symbol stream 110 in the frequency domain by using fast Fourier transformation (FFT). The frequency domain equalizer 312 equalizes the composite signal by using the corresponding channel estimates of the first symbol stream 108 and the second symbol stream 110. In various embodiments of the present invention, equalizing the composite signal may be performed by performing at least one of a Minimum Mean Squared Error equalization, frequency domain equalization, time-domain equalization, decision feedback equalization, an iterative equalization, an inter-symbol interference (ISI) cancellation, a turbo equalization, a maximum likelihood sequence estimation, and the like.

The output from the frequency domain equalizer acts as an input to the separation circuitry. The separation circuitry 314 of the receiver 106 separates the first symbol stream 108 and the second symbol stream 110 from one another as a part of the equalized composite signal 112. In one embodiment of the current invention, the separation of the first symbol stream 108 from the equalized composite signal 112 is performed in the time domain where the output of the frequency domain equalizer is first converted back into the time domain by using inverse fast Fourier transformation (IFFT) and then the separation is carried out by the IFDMA demodulating the time domain composite signal 112 by using the third communication-specific repetition factor and the third modulation code. Similarly, the separation of the second symbol stream 110 from the time domain composite signal 112 is carried out by the IFDMA demodulating the composite signal 112 by using the fourth communication-specific repetition factor and the fourth modulation code. This embodiment of the present invention is further described below.

In an embodiment of the present invention, the separation circuitry 314 can separate the first symbol stream 108 and the second symbol stream 110 from the composite signal 112 in the frequency domain after equalizing the composite signal 518 in the frequency domain. This embodiment of the present invention is further described below. In another embodiment of the present invention, the separation circuitry 314 can separate the first symbol stream 108 and the second symbol stream 110 from the frequency domain aligned composite signal 112 before equalizing the separated signals in frequency domain. This embodiment of the present invention is further described below.

The first symbol stream 108 and the second symbol stream 110 are then input to a bit-reliability metric generator 316. The bit reliability generator computes the reliability of each bit of the QAM symbol in the symbol streams. Examples of the bit-reliability metric generator can include, but are not limited to, a log-likelihood generator (LLR). The log-likelihood ratio is the ratio of probability of receiving a bit '1' to the probability of receiving a bit '0' at the receiver 106. Thus, the first symbol stream 108 is input to a first instance of the LLR generator 316 after being separated by the user separation circuitry 314. Further, second symbol stream 110 is input to a second instance of the LLR generator 316, after being separated by the user separation circuitry 314. The LLR generator 316 generates channel-state information and log-likelihood ratios of the first symbol stream 108 and the second symbol stream 110. The corresponding instances of the LLR generator 316 also take channel estimates of the first symbol stream 108 and the second symbol stream 110, as input from the frequency domain equalizer 320. The log-likelihood ratio is the ratio of probability of receiving a bit '1' of the composite signal 112 to the probability of receiving a bit '0' of the composite signal 112 at the receiver 106. The first symbol stream 108, after being processed by the first instance of the LLR generator 316, is provided as an input to the channel decoder 318 of the receiver 106. Similarly, the second symbol stream 110, after being processed by the second instance of the LLR generator 316, is provided as an input to the channel decoder 318 of the receiver 106. The first and second instances of the channel decoder 318 decode the channels of the first symbol stream 108 and the second symbol stream 110, to obtain data bits corresponding to each of the two users. It should be appreciated the number of instances of the ratio generator and the channel decoder is not limited to the two. In some embodiments of the present invention, only one ratio generator and the decoder can be used in the receiver 106. In various other embodiments of the present invention, more than one ratio generators and decoders can be used for generating log-likelihood ratios and decoding the symbol streams respectively.

Figure 5:
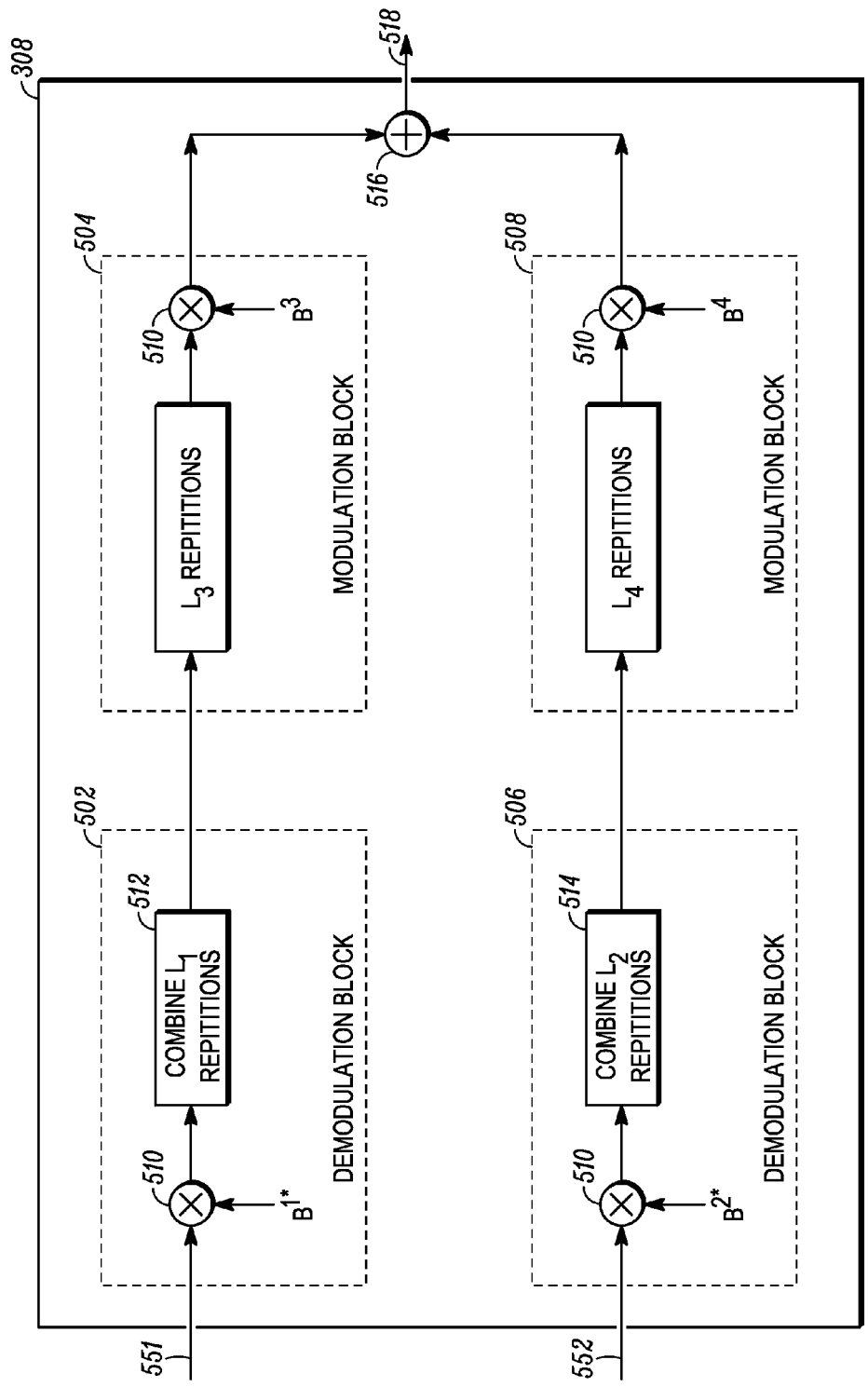
FIG. 5 represents an alignment and orthogonal combining block of the receiver in the wireless communication system, in accordance with an embodiment of the invention.

FIG. 5 illustratively shows the signal alignment and orthogonal combining block 308 of the receiver 106 in the wireless communication system 100. The signal alignment and orthogonal combining block 308 includes a first demodulation block 502, a second demodulation block 506, a first modulation block 504, a second modulation block 508, and a combining block 516. Further, each of the first demodulation block 502, the second demodulation block 506, the first modulation block 504, and the second modulation block 508 include a multiplier 510. The first symbol stream 551 of the composite signal 112 from the filtering and sampling circuitry 302 is input to the first demodulation block 502. The first symbol stream 108 is multiplied by the conjugate of the first modulation code ($B^1$) by using the multiplier block 510. The first demodulation block 502 further includes a first communication unit-specific repetition block 512 corresponding to the first user and uses the first communication unit-specific repetition factor (L1). The data symbol block repetition increases the bandwidth occupied for the first symbol stream 108 by a factor equal to the number of times the data symbol block is repeated.

Similarly, the second symbol stream 552 of the composite signal 112 is IFDMA demodulated by multiplying it by the conjugate of the second modulation code ($B^2$) by using the multiplier block 510. The second demodulation block 506 further includes a second communication unit-specific repetition block 514 corresponding to the second user and uses a second communication unit-specific repetition factor (L2). After multiplying with the second modulation code ($B^2$), the second symbol stream 552 is IFDMA demodulated by the second communication unit-specific repetition factor (L2). The output from the first communication unit-specific repetition block 512 is relayed to the first modulation block 504. Similarly, the output from the second communication unit-specific repetition block 514 is sent to the second modulation block 508. The first symbol stream 551, after being demodulated in the first demodulation block 502, is IFDMA re-modulated in the first modulation block 504 by using the third communication unit-specific repetition factor (L3), which is equal to the number of times the data symbol block is repeated. The first symbol stream 551 is then multiplied by the third modulation code ($B^3$) by using the multiplier block 510. Similarly, the second symbol stream 552, after being demodulated in the second demodulation block 506, is IFDMA re-modulated in the second modulation block 508 by using the fourth communication unit-specific repetition factor (L4), which is equal to the number of times the data symbol block is repeated. The second symbol stream 552 is then multiplied by the fourth modulation code ($B^4$) by using the multiplier block 510.

In an embodiment of the present invention, the output of the first modulation block 504 and the second modulation block 508 are summed together using the combining block 516. After being summed from the combining block 516, the composite signal 112, is sent to the frequency domain equalizer 312 as a composite signal 518. In an embodiment of the present invention, the first and second communication unit-specific repetition factor (L1) and (L2) respectively as well as the first and second modulation code ($B^1$) ($B^2$) are selected to maintain orthogonality between the first symbol stream 108 and second symbol stream 110 from the communication unit 104. Similarly, the third and fourth communication unit-specific repetition factor (L3) and (L4) respectively as well as the third and fourth modulation code ($B^3$) ($B^4$) are selected so that they help in maintaining orthogonality between the first symbol stream 108 and second symbol stream 110.

In an embodiment of the invention, a part of the signal alignment and orthogonal combining circuitry 308, as shown in FIG. 5, can be used for orthogonally combining the channel estimates of the first symbol stream 108 and the second symbol stream 110. The first modulation block 504 takes the channel estimate of the first symbol stream 108 as an input from the first channel estimator 304. The channel estimate of the first symbol stream 108 is then IFDMA modulated in the first modulation block 504 by using the third communication unit-specific repetition factor (L3), which is equal to the repetition factor of the first symbol stream 108. The channel estimate of the first symbol stream 108 is multiplied by the third modulation code ($B^3$) by using the multiplier block 510. The functioning of the first modulation block 504 and the second modulation block 508 is the same as described in FIG. 5. The first modulation block 504 and the second modulation block 506 take channel estimates of both the first symbol stream 108 and the second symbol stream 110 as inputs. The channel estimates of the first symbol stream 108 and the second symbol stream 110 are added by using the combining block 520. The orthogonally combined channel estimates of the first symbol stream 108 and the second symbol stream 110 are then provided as input to the frequency domain equalizer 312. These channel estimates are orthogonally combined in order to use a single frequency domain equalizer 320 for the first symbol stream 108 and second symbol stream 110.

Figure 6:
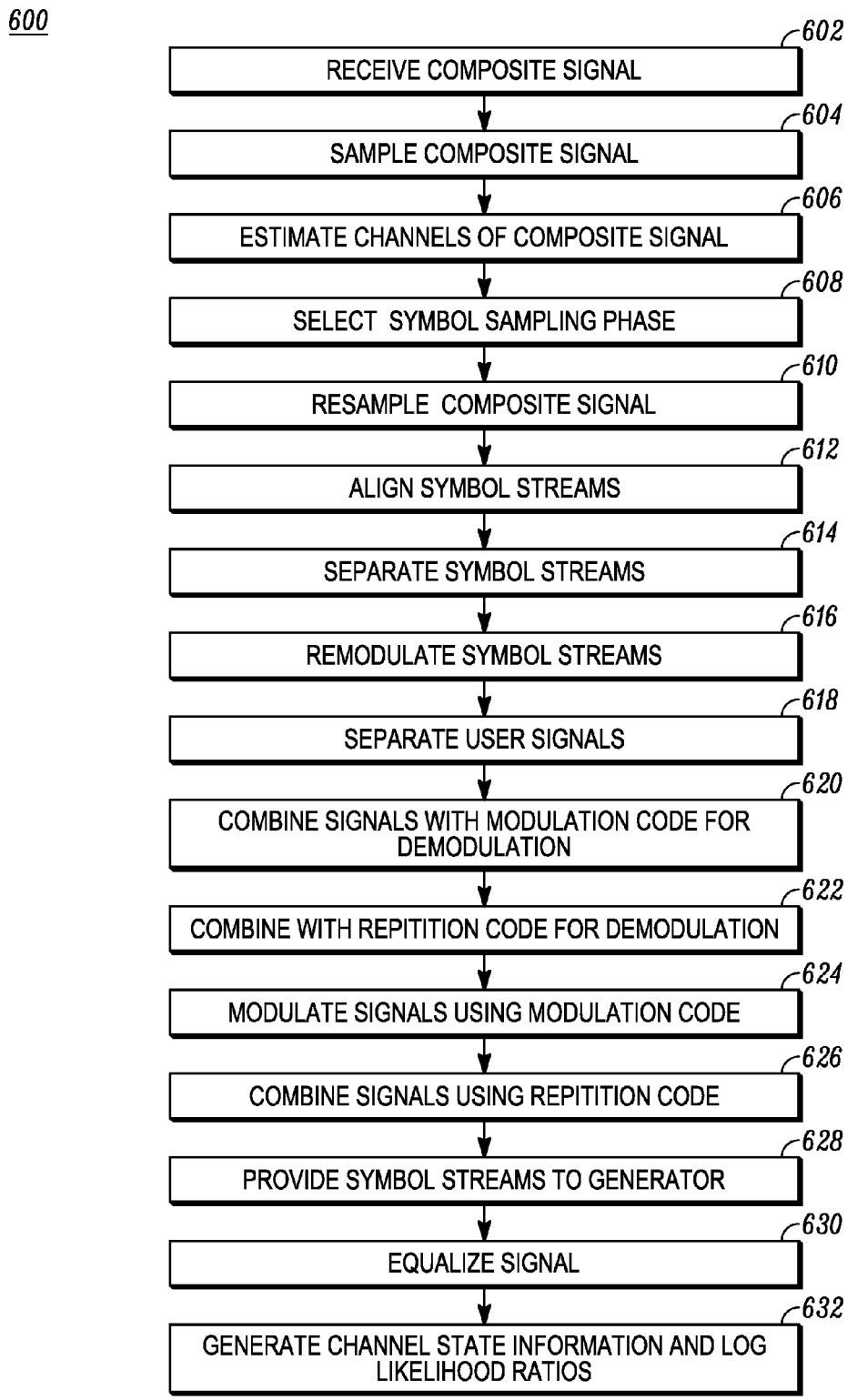
FIG. 6 represents a flowchart depicting a method for processing a composite signal, in accordance with an embodiment of the invention.

FIG. 6 illustrates a flow chart 600 of the operation of the IFDMA receiver shown in FIGS. 3-5. A composite signal 112 is received 602 by a receiving filter and sampling circuitry. The composite signal is within a channel bandwidth and includes one or more symbol streams for a plurality of different communication units. The receiving filter and sampling circuitry samples 604 the composite signal for the different symbol streams from each of the communication units. The sampling is performed at a sampling rate that can be equal to a symbol rate of the composite signal. In another embodiment, the sampling rate can be larger than the symbol rate of the composite signal. The sampled composite signal is input into an IFDMA channel estimator for each of the sampled signals from each of the plurality of communication units. The channel estimator estimates 606 the channels for each of the different signals from the plurality of communication units.

The sampled composite signal is also inputted into a phase selector that selects 608 which symbol sampling phase for each of the communication units. In an embodiment, the composite signal can be resampled 610 using the selected symbol sampling phase. The symbol sampling phase can be based on one or more of a channel estimate, a channel signal-to-noise ratio (SNR), a channel Signal-to-Interference-plus-Noise-Ratio (SINR), and a channel link quality metric estimate for one or more of the symbol streams from each of the plurality of communication units. Alternatively, the symbol sampling phase can comprise a pre-determined sampling phase based on one of the composite signals or symbol streams.

The phase sampled symbol streams from the plurality of communication units is input into a signal alignment and orthogonal combining circuit. The symbol alignment and orthogonal combining circuit aligns 612 the one or more symbol streams from the plurality of communication units to produce an aligned composite signal by separating 614 the symbol streams for each of the communication units and orthoganally recombining the symbol streams for each of the communication units based on the selected symbol sampling phase for each of the signals. In addition the phase sampled symbol streams are inputted into a channel orthogonal combining circuitry for remodulating 616 the symbol streams for the plurality of communication units.

The aligned signals from the signal alignment circuitry and the channel combining circuitry are inputted into a detection and separation circuitry with separates 618 the desired user signals out from the composite signal for each of the plurality of communication units. In an embodiment, the composite signals are IFDMA demodulated at a particular phase and then IFDMA modulated for each of the symbol streams. In IFDMA demodulation, the decimated received signal including the symbol streams is received and combined 620 with an IFDMA modulation code for the communication unit. The resulting signal is combined 622 with repetitions codes specific for the communication unit. After IFDMA demodulation, the resulting signal is IFDMA modulated 624 using the specific repetition code for the communication unit and combine 626 with the IFDMA modulation code specific for the communication unit. The detected and separated signals for the communication units are inputted into a generator and channel decoder to provide 628 the symbol streams from the composite signals. The modulated signals are combined to produce the aligned composite signal. In an embodiment, the signals are aligned by modulating a channel estimate of one or more symbol streams based on the communication unit-specific repetition factor and modulation codes and then combining the channel estimates.

With the aligned composite signal, the symbol streams from each of the plurality of communication units are separated. The separating can be done in the time domain or the frequency domain using the repetition factors and modulation codes for the communication units. To separate the symbol streams, a portion of the composite signal is equalized 630 using a channel estimate of at least one of the symbol streams of the signal. To equalize, the receiver performs one time-domain equalization, decision feedback equalization, iterative equalization, inter-symbol interference (ISI) equalization, turbo equalization and maximum-likelihood sequence estimation. The receiver can also generate 632 channel state information and log-likelihood ratios for the symbol streams and decode the symbol streams for the communication units.

Figure 7:
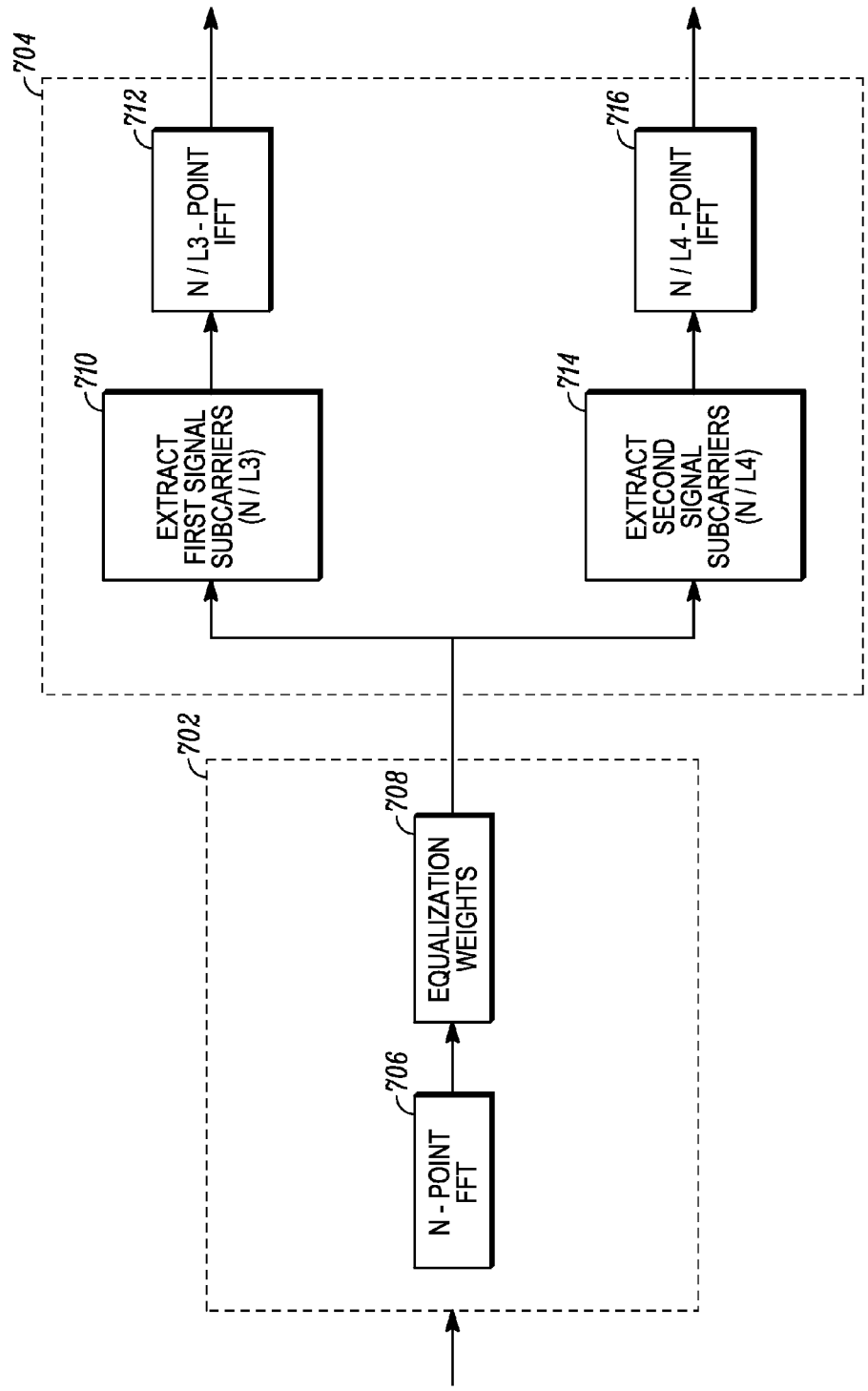
FIG. 7 represents a block diagram for equalization being performed before frequency-domain separation of multiple user signals from the composite signal, in accordance with various embodiments of the invention.

FIG. 7 represents a block diagram for the equalization being performed before frequency-domain separation of multiple user signals from the composite signal 112, in accordance with various embodiments of the invention. FIG. 7 includes a frequency domain equalizer 702 and a frequency domain separator 704. The frequency domain equalizer 702 receives the composite signal 112 from the signal alignment and orthogonal combining circuitry 308 to create a channel estimate for each of the users or remote communication units. The frequency domain equalizer 702 further includes an N-point Fast Fourier Transform (FFT) block 706 and an equalization weights block 708. The 'N' in the N-point FFT block 706 of the circuitry is equal to the number of the symbol samples in the symbol streams that form the composite signal 112. The N-point FFT block 706 takes the composite signal 112 in time-domain as an input from signal alignment and orthogonal combining circuitry 308, and transforms it into a discrete frequency-domain representation of the composite signal 112. The equalization weights block 708 processes the composite signal 112 in the frequency-domain, as is output by the N-point FFT block 706 and is based on channel estimates. The equalization weights block 708 equalizes the composite signal 112 by applying equalization weights to the composite signal 112. The equalization weights are different for different symbol streams of the composite signal 112. For example, the equalization weight for the first symbol steam 108 may be different from the equalization weight for the second symbol steam 110.

The frequency domain separator 704 further includes a first symbol stream sub-carrier extraction circuitry 710, an N/L3-point inverse FFT (IFFT) block 712, a second symbol stream sub-carrier extraction circuitry 714, and an N/L4-point Inverse FFT (IFFT) block 716. The composite signal 112, after being equalized by the equalization block 708, is provided to the frequency domain separation block 704. The first symbol stream sub-carrier extraction circuitry 710 extracts the N/L3 sub-carriers occupied by the first symbol stream 108 from the composite signal 112. An inverse fast Fourier transform (IFFT) is then performed on the first symbol stream 108 by the N/L3-point IFFT block 712. The N/L3-point IFFT block 712 transforms the first symbol stream 108 back to the time domain. The first symbol stream 108 is then sent to the LLR generator 316. Similarly, the second symbol stream sub-carrier extraction circuitry 714 of the frequency domain separator 704 extracts the N/L4 sub-carriers occupied by the second symbol stream 110 from the composite signal 112. The second symbol stream sub-carrier extraction circuitry 714 of the frequency domain separator 704 separates the second symbol stream 110 from the composite signal 112 by using the second communication unit-specific repetition factor (L4). An IFFT is performed on the second symbol stream 110 by using the N/L4-point IFFT block 716. The N/L4-point IFFT block 716 transforms the second symbol stream 110 back to the time domain. The second symbol stream 110 is then sent to the LLR generator 316. It should be appreciated that the order of operations performed on the first symbol stream 108 and the second symbol stream 110 is interchangeable and hence does not affect the separation of the first symbol stream 108 and the second symbol stream 110 from the composite signal 112.

Figure 8:
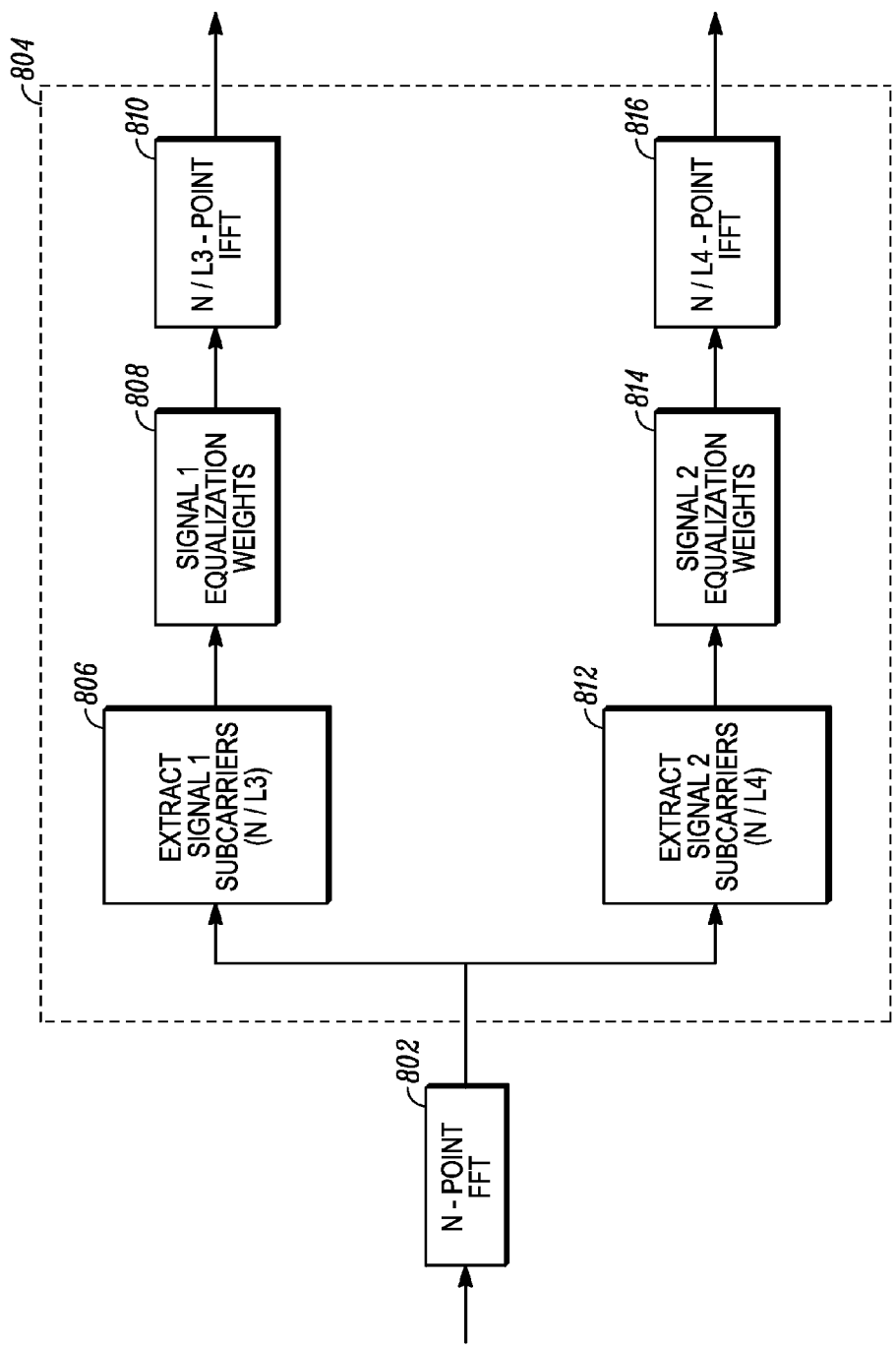
FIG. 8 represents a block diagram for equalization being performed after frequency-domain separation of multiple user signals from the composite signal, in accordance with various embodiments of the invention.

FIG. 8 represents a block diagram for equalization being performed after frequency domain separation of multiple user signals from the composite signal 112, in accordance with various embodiments of the invention. FIG. 8 includes an N-point FFT block 802 and a frequency domain detector and separator 804. The frequency domain detector and separator 804 includes a first symbol stream sub-carrier extraction circuitry 806, a first equalization block 808, an N/L3-point IFFT block 810, a second symbol stream sub-carrier extraction circuitry 812, a second equalization block 814, and an N/L4-point IFFT block 816. The 'N' in the N/L3-point FFT block 810 and N/L4-point FFT block 816 of the circuitry is equal to the number of the symbol samples in the symbol streams that compose the composite signal 112. The N-point FFT block 802 receives the composite signal 112 from the signal alignment and orthogonal combining circuitry 308. The composite signal 112 is transformed to frequency domain from time domain by using the N-point FFT block 802. The composite signal 112, which is in the frequency domain, as output by the N-point FFT block 802, is input to the frequency domain detector and separator 804. The first symbol stream sub-carrier extraction circuitry 806 of the frequency domain separator 804 separates the first symbol stream 108 from the composite signal 112 by using the first communication unit-specific repetition factor (L3).

As between FIGS. 7 and 8, equalization is conducted as different times. In FIG. 7, equalization is performed before extracting subcarriers for the different communication units. While in FIG. 8, equalization is performed after extracting subcarriers for the different communication units.

The first symbol stream 108 is equalized in the frequency domain using the first equalization block 808. The equalization weights block 808 equalizes the composite signal 112, which is in the frequency-domain, by applying equalization weights to the composite signal 112. The equalization weights are different for different symbol streams of the composite signal 112. The output of the first equalization block 808 is provided as an input to the N/L3-point IFFT block 810. An inverse fast Fourier transform is performed on the first symbol stream 108 by using the N/L3-point IFFT block 810. The N/L3-point IFFT block 810 transforms the first symbol stream 108 back to time domain. The first symbol stream 108 is then sent to the LLR generator 316. Similarly, the second symbol stream sub-carrier extraction circuitry 812 of the frequency domain separator 804 separates the second symbol stream 110 from the composite signal 112. The second symbol stream sub-carrier extraction circuitry 812 of the frequency domain separator 804 separates the second symbol stream 110 from the composite signal 112 by using the second communication unit-specific repetition factor (L4). The second symbol stream 110 is equalized in the frequency domain by using the second equalization block 814. The output of the second equalization block 814 is provided as an input to the N/L4-point IFFT block 816. An inverse fast Fourier transform is performed on the second subscriber signal by using the N/L4-point IFFT block 816. The N/L4-point IFFT block 816 transforms the second symbol stream 110 back to the time domain. The second symbol stream 110 is then sent to the LLR generator 316.

Figure 9:
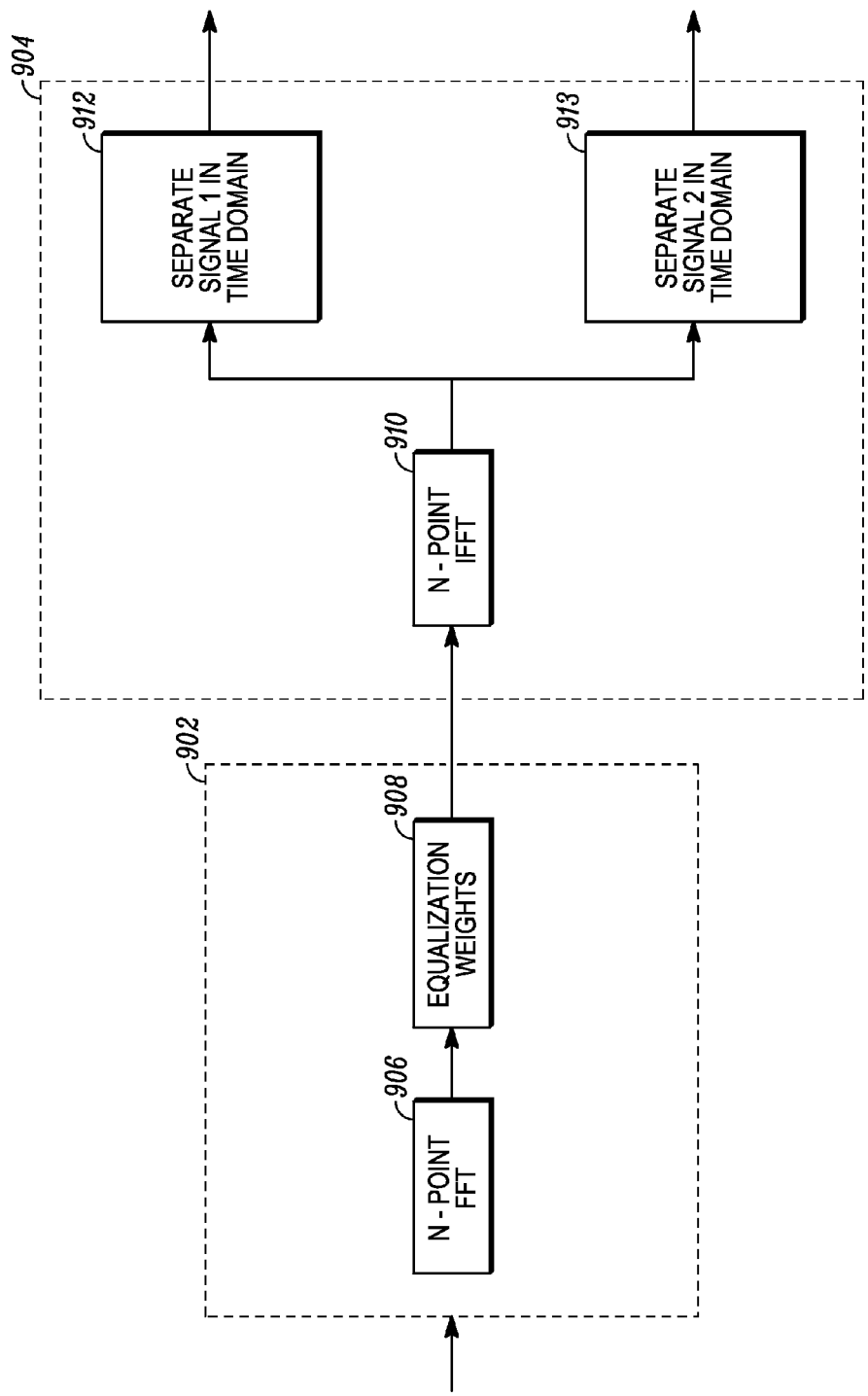
FIG. 9 represents a block diagram for multiple users separation in the time domain after equalization being performed in the frequency-domain, in accordance with various embodiments of the invention.

FIG. 9 represents a block diagram for the equalization being performed before a time-domain separation of multiple user signals from the composite signal 112 where the IFFT to put the signal in the time domain is performed prior to separation of the signal, in accordance with various embodiments of the invention. FIG. 9 includes a frequency domain equalizer 902 and a time domain separator 904. The frequency domain equalizer 902 is similar to the frequency domain equalizer on FIG. 7. The time domain separator 904 includes an N-point Inverse Fast Fourier Transform (IFFT) block 910. The time domain separator 904 further includes a first stream separator block 912 and a second stream separator block 913. The 'N' in the N-point IFFT block 910 of the circuitry is equal to the number of the symbol samples in the symbol streams that form the composite signal 112. The N-point IFFT block 910 takes the equalized composite signal in frequency-domain as an input from the equalization circuitry 902, and transforms it into a time-domain representation of the composite signal.

The first symbol stream time domain separator 912 separates the first symbol stream 108 from the composite signal 112 by using the third communication unit-specific repetition factor (L3) and the third modulation code ($B^3$). The first symbol stream 108 is then sent to the LLR generator 316. Similarly, the second symbol stream time domain separator 913 separates the fourth symbol stream 110 from the composite signal 112 by using the first communication unit-specific repetition factor (L4) and the fourth modulation code ($B^4$). The second symbol stream 110 is then sent to the LLR generator 316. It should be appreciated that the order of operations performed on the first symbol stream 108 and the second symbol stream 110 is interchangeable and hence does not affect the separation of the first symbol stream 108 and the second symbol stream 110 from the composite signal 112.

Figure 10:
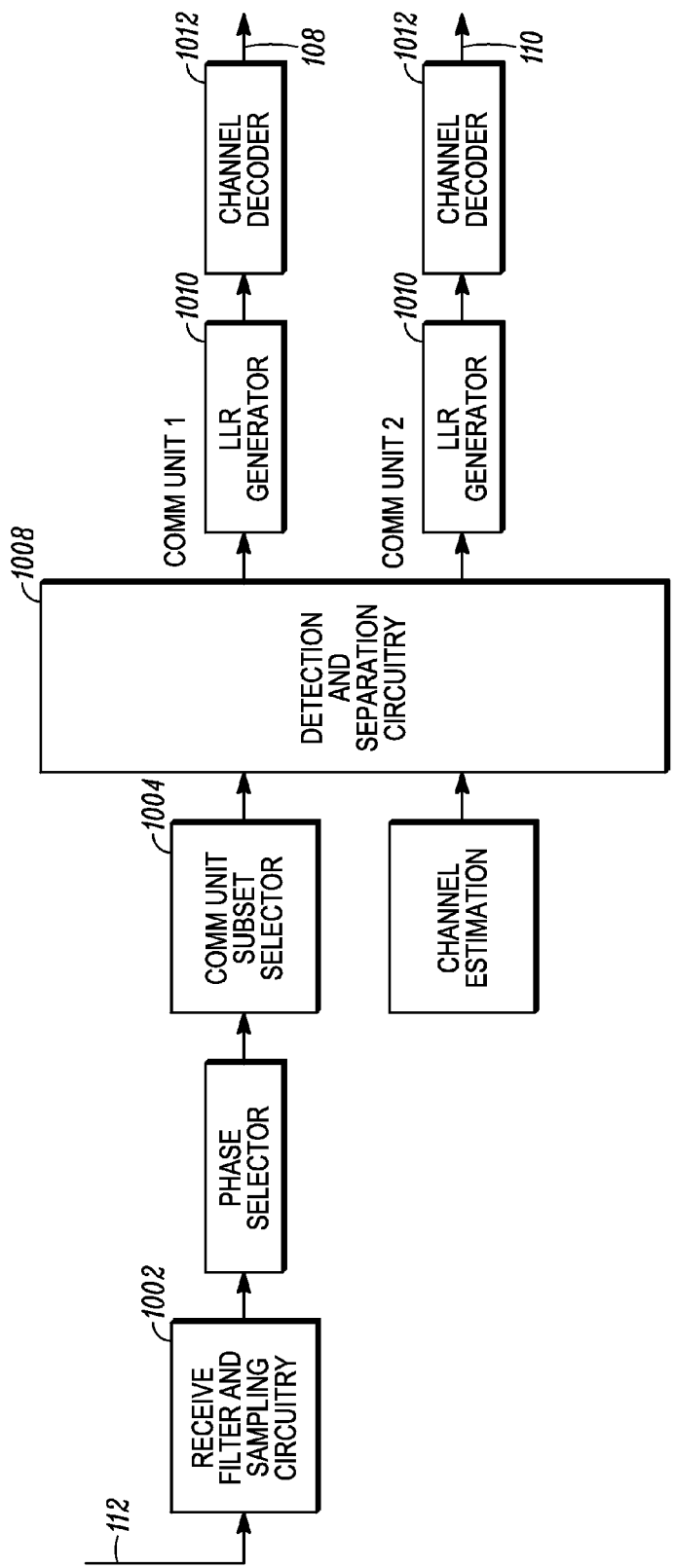
FIG. 10 illustrates a block diagram of a receiver in the wireless communication system, in accordance with another embodiment of the invention.

FIG. 10 illustrates a block diagram of the receiver 106 in the wireless communication system 100, in accordance with various embodiments of the invention. The composite signal 112 is comprises the first symbol stream 108 and the second symbol stream 110. It should be appreciated that the composite signal 112 is shown to include the first symbol stream 108 and the second symbol stream 110 only for exemplary purposes. The composite signal 112 may also include more than two symbol streams in practice. The receiver 106 takes the composite signal 112 as an input and then performs demodulation, detection, separation of the composite signal into the first symbol stream 108 and the second symbol stream 110 followed by decoding. The order of operation of demodulation, detection, separation can be interchanged and will be elaborated in various embodiments of the invention described below. The first symbol stream 108 and the second symbol stream 110 correspond to different users. The receiver 106 includes a receiving circuitry and a sampling circuitry 1002, a symbol sampling phase selector 1003, a communication unit subset selector 1004, a channel estimator 1005 and a detection and separation circuitry 1008. The receiving circuitry and sampling circuitry 1002 and symbol sampling phase selector 1003 are respectively similar to the receiving circuitry 204, sampling circuitry 206 and symbol-sampling phase selector 208 of FIG. 2. The outputs of the sampling circuitry 1006 and the symbol sampling phase selector act as inputs communication unit subset selector 1004 and therefore to the detection and separation circuitry 1008. The detection and separation circuitry 1008 of the receiver 106 detects the different symbol streams, that have the same selected sampling phase, from the decimated composite signal 112 by using the corresponding selected symbol-sampling phase selected by the symbol-sampling phase selector 1003. The detection and separation circuitry 1008 further separates the composite signal 112 in the first symbol stream 108 and the second symbol stream 110. Hence, the first symbol stream 108 and the second symbol stream 110 are obtained by the communication unit 104 as the output of the detection and separation circuitry 1012.

After the separation of the first symbol stream 108 and the second symbol stream 110, both the symbol streams are processed by separate instances of the ratio generator. In an example, the ratio generator is a log-likelihood ratio generator (LLR) 1010. In an embodiment of the present invention, the first symbol stream 108 is then input to a first instance of the LLR generator 1010, after being separated by the user separation circuitry of block 1008. Further, the second symbol stream 110 is input to a second instance of the LLR generator 1010 after being separated by the user separation circuitry of block 1008. The corresponding instances of the LLR generator 1010 also take input from the equalizer of block. The first symbol stream 108, after being processed by the first instance of the LLR generator 1010, is input to a first instance of the channel decoder 1012 of the receiver 106. The second symbol stream 110, after being processed by the second instance of the LLR generator 1010, is input to a second instance of the channel decoder 1012 of the receiver 106. The channel decoder 1212 decodes the channels of the first symbol stream 108 and the second symbol stream 110. The first symbol stream 108 and the second symbol stream 110 are decoded by using the channel decoder 1012 of the receiver 106. It should be appreciated the number of instances of the ratio generator and the channel decoder 1012 is not limited to the two. In some embodiments of the present invention, only one ratio generator and the decoder can be used in the receiver 106. In various other embodiments of the present invention, more than one ratio generators and decoders can be used for generating log-likelihood ratios and decoding the symbol streams respectively.

It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:
1. A method comprising:
receiving a composite signal within a channel bandwidth, wherein the composite signal comprises one or more symbol streams from a plurality of communication units;
sampling the composite signal at a sampling rate, wherein the sampling rate comprises one of equal to a symbol rate of the composite signal or larger than the symbol rate of the composite signal;
selecting a symbol sampling phase for each of the symbol streams from a plurality of communication units;

aligning the one or more symbol streams from each of the plurality of communication units to produce an aligned composite signal by separating the symbol streams for each of the plurality of communication units and orthogonal recombining the symbol streams for each of the plurality of communication units based on the selected symbol sampling phase for each of the plurality of signals; and separating the one or more symbol streams for each of the plurality of communication units based on the aligned composite signal.

2. The method of claim 1, wherein selecting a symbol sampling phase comprises resampling the composite signal based on the selected symbol sampling phase for at least one of the signals.

3. The method of claim 1, wherein selecting the symbol sampling phase comprises selecting the symbol sampling phase based on one or more of a channel estimate, a channel signal to noise ratio (SNR), a channel Signal to Interference-plus-Noise Ratio (SINR), and a channel link quality metric estimate for the one or more symbol streams of the communication unit.

4. The method of claim 1, wherein selecting the symbol sampling phase comprises selecting a pre-determined sampling phase for at least one of the signals.

5. The method of claim 1, wherein aligning one or more symbol streams comprises:

separating the one or more symbol streams by demodulating the composite signal for each of the plurality of communication units at the selected symbol sampling phase for the communication unit based on a first communication unit-specific repetition factor and a first communication unit-specific modulation code;

modulating each of the demodulated signals for the plurality of communication units based on a second communication unit-specific repetition factor and a second communication unit-specific modulation code, wherein the second communication unit-specific repetition factor and the second communication unit-specific modulation code are selected to maintain orthogonality between the modulated signals for the plurality of communication units; and combining the modulated signals to produce the aligned composite signal.

6. The method of claim 1, wherein aligning the signals from each of the plurality of communication units further comprises:

modulating a channel estimate of the one or more symbol streams based on a communication unit-specific repetition factor and communication unit-specific modulation code; and combining the modulated channel estimates.

7. The method of claim 1, wherein separating the one or more symbol streams of the signal comprises equalizing a portion of the aligned composite signal using a channel estimate of the one or more symbol streams of the signal.

8. The method of claim 7, wherein equalizing comprises performing one of time-domain equalization, decision feedback equalization, iterative equalization, inter-symbol interference (ISI) cancellation, turbo equalization, and maximum likelihood sequence estimation.

9. The method of claim 1, wherein separating the one or more symbol streams comprises separating the one or more symbol streams in a time-domain by demodulating the detected symbol stream based on a communication unit-specific repetition factor and a communication unit-specific modulation code.

10. The method of claim 1, wherein separating the one or more symbol streams comprises separating after detecting the one or more symbol streams in a frequency-domain based on a communication unit-specific repetition factor and a communication unit-specific modulation code.

11. The method of claim 1, wherein separating the one or more symbol streams further comprises separating before detecting the one or more symbol streams in a frequency-domain based on a communication unit-specific repetition factor and a communication unit-specific modulation code.

12. The method of claim 1 further comprising generating channel state information and log-likelihood ratios for the one or more symbol streams from each of the plurality of communication units and decoding the one or more symbol streams of the signal from each of the plurality of communication units.

13. An apparatus comprising:

a receiver for receiving a composite signal within a channel bandwidth, wherein the composite signal comprises a one or more symbol streams from a plurality of communication units;

a sampler for sampling the composite signal at a sampling rate, wherein the sampling rate comprises one of equal to a symbol rate of the composite signal or larger than the symbol rate of the composite signal;

a selector for selecting a symbol sampling phase for each of the at least one symbol streams;

alignment circuitry for aligning the one or more symbol streams from each of the plurality of communication units to produce an aligned composite signal by separating the symbol streams for each of the plurality of communication units and orthogonally recombining the symbol streams for each of the plurality of communication units using the selected symbol sampling phase for each of the plurality of signals; and a separator for separating the one or more symbol streams signal for each of the plurality of communication units using the aligned composition signals.

14. The receiver of claim 13, wherein the alignment circuitry comprises:

a demodulator for demodulating the one or more symbol streams using a first communication unit-specific repetition factor and a first modulation code;

a modulator for modulating the one or more symbol streams using a second communication unit-specific repetition factor and a second modulation code; and a combining circuitry for combining at least one modulated symbol stream.

15. The apparatus of claim 13 further comprising a frequency equalizer for equalizing a portion of the aligned composite signal using a channel estimate for one or more symbol streams.

16. The apparatus of claim 13 further comprising at least one ratio generator for generating log-likelihood ratios for the one or more symbol streams.

17. The apparatus of claim 13 further comprising at least one channel decoder for decoding the one or more symbol streams.

18. The apparatus of claim 17 further comprises a user separation circuitry for separating the one or more symbol streams.

19. The apparatus of claim 18 further comprising:

a generator for generating log-likelihood ratios for the one or more symbol streams, and a decoder for decoding the one or more symbol streams.

* * * * *